United States Patent [19]

Ricke

[11] Patent Number: 4,534,088
[45] Date of Patent: Aug. 13, 1985

[54] HOLE PLUG

[76] Inventor: James Ricke, 38 W. 594 Hilltop Dr., St. Charles, Ill. 60174

[21] Appl. No.: 526,955

[22] Filed: Aug. 29, 1983

[51] Int. Cl.³ .............................................. B65D 39/00
[52] U.S. Cl. ........................................ 24/295; 24/293; 24/297; 24/113 MP; 220/307
[58] Field of Search ................. 24/295, 291, 292, 293, 24/297, 113 MP; 301/37 B; 220/307; 285/162, 194

[56] References Cited

U.S. PATENT DOCUMENTS

| | | |
|---|---|---|
| 1,753,631 | 4/1930 | Walters ................................ 220/307 |
| 1,800,173 | 4/1931 | Anderson ............................ 220/307 |
| 2,265,957 | 12/1941 | Tinnerman .......................... 24/295 |
| 2,552,917 | 5/1951 | Becker ................................ 220/307 |
| 2,590,264 | 3/1952 | Meyers et al. ....................... 24/297 |
| 3,153,975 | 10/1964 | Rapata ................................. 24/295 |
| 3,168,961 | 2/1965 | Yates ................................... 220/307 |
| 3,204,308 | 9/1965 | Jaworski ............................. 24/293 |
| 3,417,439 | 12/1968 | Seckerson .......................... 24/297 |
| 4,091,962 | 5/1978 | Van Buren, Jr. .................... 220/307 |

FOREIGN PATENT DOCUMENTS 1019521 2/1966 United Kingdom ................. 24/297

Primary Examiner—Victor N. Sakran
Attorney, Agent, or Firm—Hauke and Patalidis

[57] ABSTRACT

A plug for closing an opening or hole in a panel, plate or wall, comprising a head portion and a shank portion. The head portion has a peripheral flange forming an internal groove in which is disposed the edge of an annular base portion of the shank portion, the annular base portion being split and elastically compressible for engaging, during assembly, the edge thereof within the groove when the annular member is allowed to relax to is original dimension and shape.

8 Claims, 7 Drawing Figures

U.S. Patent     Aug. 13, 1985     4,534,088
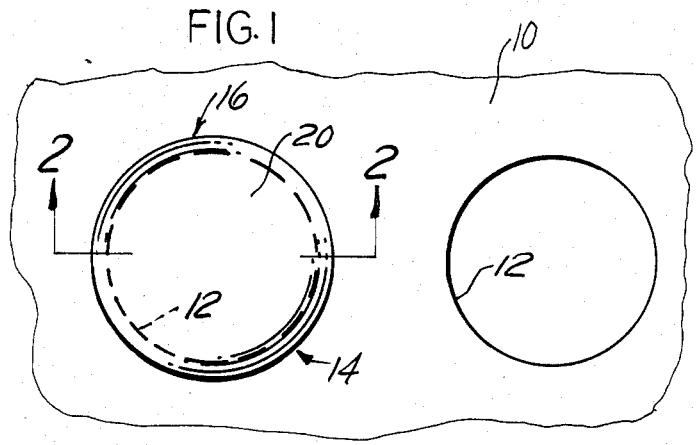
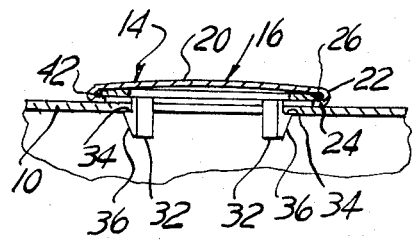
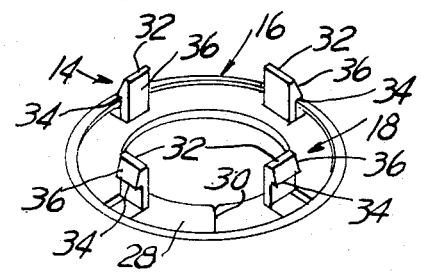
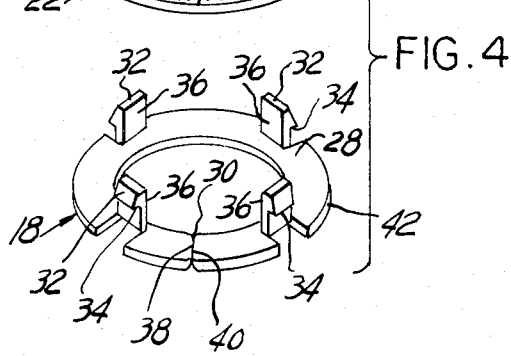
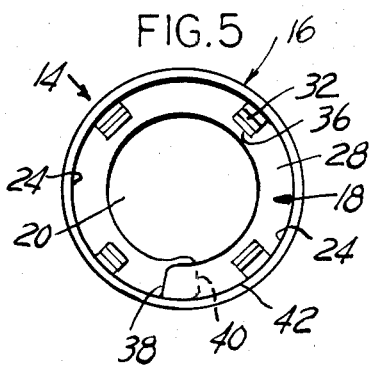
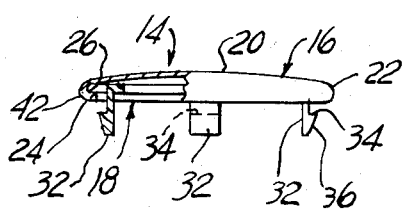
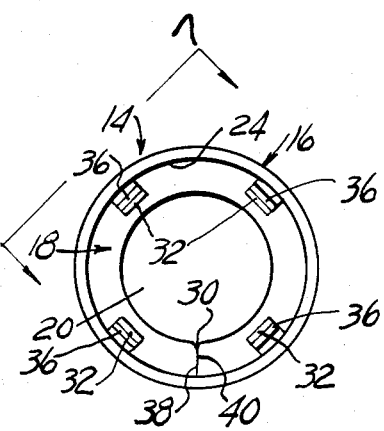

HOLE PLUG

BACKGROUND OF THE INVENTION

The present invention relates to plugs for closing openings or holes in sheet metal panels, in wood panels, and the like.

It is common to provide sheet metal panels or walls, or wood panels or walls, with openings which are covered with plugs when not in use. When it is desired to place an opening to a practical use, the corresponding plug is removed to uncover the opening.

Various types of plugs have been provided in the past, for that purpose, such as disclosed for example in U.S. Pat. No. 1,800,173 and 3,168,961. Such plugs are generally either stamped of sheet metal or molded of plastic, provided with a domed body and an integral shank or with fingers, sometimes provided with barbs, steps and like side protrusions which retain the plug in position over the opening or hole after the shank or fingers have been inserted in the opening or hole.

It is desirable that such plugs be manufactures in great quantity at as low a cost as possible, while still being attractive in appearance, being capable of ready manual insertion, and capable of being held securely once the shank or fingers are inserted in an opening or hole.

SUMMARY OF THE INVENTION

The present invention provides an aperture or hole plug made of two portions or parts which can be economically produced separately, which are easy to assemble and which, once assembled, provide a solid sturdy assembly which, as a result of the particular structure of the two parts in assembly, provides interlocking between the part such that normal manipulation does not permit the parts from separating. One advantage of the invention is that appropriate materials may be selected for each of the two parts in assembly, one being the plug head and the other being the plug shank provided with prongs or fingers holding the plug in position over the opening or hole.

The many objects and advantages of the present invention will become apparent to those skilled in the art when the following description of the best mode contemplated for practicing the invention is read in conjunction with the accompanying drawing wherein:

BRIEF DESCRIPTION OF THE DRAWING

FIG. 1 is a plan view of a plate or panel having an uncovered opening and another opening covered by a plug according to the present invention;

FIG. 2 is a section along line 2—2 of FIG. 1;

FIG. 3 is a bottom perspective view of a hole plug according to the present invention;

FIG. 4 is an exploded perspective view thereof;

FIG. 5 is a bottom plan view showing the two parts forming the hole plug of the invention in the process of being assembled;

FIG. 6 is a bottom plan view of a hole plug according to the present invention; and FIG. 7 is a side elevation view thereof from line 7—7 of FIG. 6 with portion cut away for showing the internal construction.

DETAILED DESCRIPTION OF THE PREFERRED EMBODIMENT

Referring to the drawing and more particularly to FIG. 1, there is illustrated a plate or panel 10, provided with apertures such as round holes 12. The plate or panel 10, which may be made of steel, or other metal or metal alloy, or which may be made of wood, or plastic, or the like, may be, for example a panel, wall or partition in an appliance, such as a refrigerator for example, or the instrument panel of a motor vehicle, or any other article where pre-punched or pre-drilled holes are provided for the mounting of accessories, instruments, the passage of pipes, etc.. when not in use, for functional and aesthetic purpose the holes 12 are obturated by a plug, such as the plug 14, as best shown at FIGS. 2-7, is made of a dome-shaped button-like head portion 16, and of an annular prong or finger provided shank portion 18.

In the example of structure illustrated, the plug head portion 16 is formed of a relatively thin wall disk either flat or slightly dished, as shown at 20, provided with a marginal inwardly curved rounded flange 22 having a circular edge 24 of a diameter slightly less than the over-all diameter of the head portion 16. A groove 26 is thus peripherally disposed internally within the button-like head portion 16.

The annular shank portion 18 is in the form of a flat resilient annular member or ring 28 having a radial slit 30, and a plurality of extending prongs or fingers 32, four in number in the structure illustrated, extending substantially orthogonal to the plane of the flat annular member or ring 28. Each prong or finger 32 is formed with an exteriorly disposed barb or step 34 and a tapered exterior end portion 36, forming a ramp surface.

The button-like head portion 16 may be made of any appropriate material such as for example thin sheet steel, stainless steel, and the like, manufactured by stamping, including forming of the bent over inwardly curved peripheral flange 22 defining the internal annular groove 26. Alternatively, the button-like head portion 16 may be molded of plastic. The shank portion 18 may be similarly made of sheet metal and stamped, or it may be made of a plastic molding of relatively strong but nevertheless resilient plastic material such as polyethylene, nylon or the like. Due to its resilience, the flat annular member or ring 28 of the shank portion 18 is capable of being diametrically collapsed, as illustrated at FIG. 5, such that the ends 38 and 40 of the annular member 28 at the slit 30 are caused to overlap, thus reducing the outer diameter of the annular member or ring 28 to a diameter less than that of the internal edge 24 of the rounded flange 22 of the button-like head portion 16. The annular member or ring 28 of the shank portion 18 may thus be placed within the button-like head portion 16 and allowed to spring back to its original dimension and shape, FIG. 6, causing the peripheral edge 42, FIGS. 2 and 7, of the annular member or ring 28 to be engaged in the groove 26, below the inwardly directed edge 24 of the rounded flange 22 of the button-like head portion 16, thus holding the annular member or ring 28 of the shank portion 18 solidly and sturdily within the button-like head portion 16 of the plug 14. The annular member or ring 28 remains in its expanded state in view of its ends 38 and 40 abutting against each other at the slit 30 and of its edge 42 engaged in the curved bottom of the groove 26, both preventing the annular member or ring 28 from collapsing and becoming separated from the head portion 16.

When placed in position for obturating an opening or hole 12, the plug 14 is simply manually pressed over the opening or hole, which causes the fingers 32 of the shank portion 18 to resiliently bend inwardly as a result of the pressure applied by the edge of the opening or hole 12 against the tapered or ramp portion 36 of the fingers, until the fingers 32 spring back to their normal position as soon as the barbed or stepped portion 34 of the fingers clear the edge of the hole.

It will be appreciated by those skilled in the art that making the plug 14 of the invention in two separate parts, namely the button-like head portion 16 and the separate shank portion 18, which are easily assembled either manually or automatically, permits to reduce considerably the cost of manufacturing as compared to a plug made of a single piece. Furthermore, the structure of the invention permits to use different materials for making the button-like head portion 16 and the shank portion 18. Not being limited as to the choice of materials results in allowing a great variety of plug sizes, appearances and functions with great flexibility, and permitting standardization of the components to accommodate different sizes and shapes of openings or holes to be plugged, and different thicknesses of panels with openings or holes to be plugged. It will also be appreciated that rather than being circular, the head portion 16 may take any other shape, such as oval, triangular, square, etc.

Having thus described the present invention by way of a typical example of structure well designed to accomplish the objects of the invention, modification whereof will be apparent to those skilled in the art, what is claimed as new is as follows:

I claim:

1. A plug for obturating an opening in a panel and the like, said plug comprising a head portion of a diameter sufficient to overlap the opening and a separate shank portion, said head portion having an integral flange portion formed with a bent over edge forming an internal retaining groove, and said shank portion being formed as a flat annular member of an outer diameter substantially equal to the diameter of said groove in said head portion, said annular member having a single transverse slit defining abutting ends and a peripheral edge adapted to be disposed in said groove after assembly by compressibly reducing the outer diameter of said annular member by overlapping said ends and allowing said member to peripherally expand with said edge engaged in said groove and said ends disposed in abutting engagement, wherein said annular member has a plurality of projecting fingers elastically deformable for introduction of said shank portion into the opening, said fingers having a peripheral abutment portion engageable with a surface of said plate at the edge of the opening for preventing removal of said plug from over the opening.

2. The plug of claim 1 wherein said head portion is in the form of a circular domes member.

3. The plug of claim 1 wherein said fingers are each in the form of a projecting prong having said peripheral abutment portion in the form of a step, and comprising a portion between the end of said prong and said abutment portion having a camming tapered surface promoting deflection of said fingers when said plug shank portion is pushed into an opening.

4. The plug of claim 2 wherein said fingers are each in the form of a projecting prong having said peripheral abutment portion in the form of a step, and comprising a portion between the end of said prong and said abutment portion having a camming tapered surface promoting deflection of said fingers when said plug shank portion is pushed into an opening.

5. A method of manufacturing a plug for closing an opening in a plate, said method comprising forming a head portion with an inwardly directed marginal groove, forming a separate shank portion provided with gripping fingers and comprising a resilient annular member having a single transverse slit defining abutting ends, and assembling the two portions together by collapsing said annular member by overlapping the ends for placing the edge of said annular member in said groove and allowing the annular member to spring back to its original dimension and shape whereby the ends thereof are abutting.

6. The method of claim 5 wherein said portions are made of the same material.

7. The method of claim 5 wherein said portions are made of different material.

8. The method of claim 5 wherein one of said portions is metallic and the other is plastic.

* * * * *